(12) United States Patent
Varma et al.

(10) Patent No.: US 7,000,061 B2
(45) Date of Patent: Feb. 14, 2006

(54) CACHING QUEUE STATUS UPDATES

(75) Inventors: Anujan Varma, Santa Cruz, CA (US); Robert C. Restrick, Hipatcong, NJ (US); Jaisimha Bannur, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 10/393,680

(22) Filed: Mar. 20, 2003

(65) Prior Publication Data

US 2003/0235188 A1 Dec. 25, 2003

Related U.S. Application Data

(60) Provisional application No. 60/367,522, filed on Mar. 25, 2002.

(51) Int. Cl.
G06F 13/36 (2006.01)

(52) U.S. Cl. .................. 710/310; 710/52; 710/29; 709/234; 709/239; 370/235; 711/122

(58) Field of Classification Search ............... 712/202; 370/230, 258; 711/3, 113; 710/54
See application file for complete search history.

(56) References Cited

U.S. PATENT DOCUMENTS

| 4,092,732 | A | 5/1978 | Ouchi |
| 4,331,956 | A | 5/1982 | Anderson |
| 4,335,458 | A | 6/1982 | Krol |
| 4,695,999 | A | 9/1987 | Lebizay |
| 5,127,000 | A | 6/1992 | Henrion |
| 5,191,578 | A | 3/1993 | Lee |
| 5,260,935 | A | 11/1993 | Turner |
| 5,274,785 | A | 12/1993 | Kuddes |
| 5,442,752 | A | 8/1995 | Styczinski |
| 5,483,523 | A | 1/1996 | Nederlof |
| 5,643,157 | A | 7/1997 | Williams |
| 5,682,493 | A | 10/1997 | Yung |
| 5,832,278 | A | 11/1998 | Pham |
| 5,848,434 | A | 12/1998 | Young |
| 5,859,835 | A | 1/1999 | Varma |
| 5,860,097 | A | 1/1999 | Johnson |
| 5,978,951 | A | 11/1999 | Lawler |
| 5,999,518 | A * | 12/1999 | Nattkemper et al. ........ 370/258 |
| 6,055,625 | A | 4/2000 | Nakada |
| 6,061,345 | A | 5/2000 | Hahn |
| 6,167,508 | A | 12/2000 | Farrell |
| 6,170,032 | B1 | 1/2001 | Izzard |
| 6,188,698 | B1 | 2/2001 | Galand |
| 6,282,686 | B1 | 8/2001 | Cypher |
| 6,321,306 | B1 | 11/2001 | Arimilli |
| 6,359,891 | B1 | 3/2002 | Bergantino |
| 6,408,378 | B1 | 6/2002 | O'Connor |
| 6,502,184 | B1 * | 12/2002 | Zhang et al. ............... 712/202 |
| 2001/0043565 | A1 * | 11/2001 | Chen et al. ................. 370/230 |

\* cited by examiner

*Primary Examiner*—Mano Padmanabhan
*Assistant Examiner*—Mardochee Chery
(74) *Attorney, Agent, or Firm*—Ryder IP Law, PC; Douglas J. Ryder

(57) ABSTRACT

In general, in one aspect, the disclosure describes an apparatus capable to select a queue. The apparatus includes a queue occupancy device to indicate an occupancy status of the queues, a queue occupancy cache to record an update in occupancy status of a particular queue, a next queue selector to select a queue based on said queue occupancy device and a most recently serviced queue, and a queue identification register to identify a most recently serviced queue.

32 Claims, 14 Drawing Sheets

|  | Phase 1 | Phase 2 | Phase 3 | Phase 4 |
|---|---|---|---|---|
| Initiate Memory Read | INSERT | SEARCH | REMOVE | |
| Write to Cache | | INSERT | SEARCH | REMOVE |
| Modify | REMOVE | | INSERT | |
| Write | | REMOVE | | INSERT |

*FIG. 14*

|  | Phase 1 | Phase 2 | Phase 3 | Phase 4 |
|---|---|---|---|---|
| Initiate Memory Read | SEARCH | INSERT | REMOVE | |
| Write to Cache | | SEARCH | INSERT | REMOVE |
| Modify | REMOVE | | | INSERT |
| Write | INSERT | REMOVE | | |

*FIG. 15*

|  | Phase 1 | Phase 2 | Phase 3 | Phase 4 |
|---|---|---|---|---|
| Initiate Memory Read | ENABLE | SEARCH | | |
| Write to Cache | | ENABLE | SEARCH | |
| Modify | | | ENABLE | |
| Write | | | | ENABLE |

*FIG. 16*

CACHING QUEUE STATUS UPDATES

This application claims priority under 35 U.S.C. §119(e) of U.S. Provisional Application No. 60/367,522 entitled "High-speed search structure and method for round-robin servicing of a large number of packet queues" filed on Mar. 25, 2002 which is herein incorporated by reference, but is not admitted to be prior art.

BACKGROUND

Description

Switches and routers used in packet networks, such as the Internet, are store-and-forward devices. In these types of devices, the arriving packets are initially stored in memory. The packets are later read out and forwarded to the appropriate destination. A scheduling algorithm determines when to forward a packet out of the switch or router. The data in memory can be organized as several queues, based on the attributes of the incoming data, such as its destination, class of service, etc. The number of queues used in packet switches and routers has been increasing dramatically due to both an increase in total throughput, and the use of fine-grained Quality of Service (QoS) among a large number of traffic streams.

A search for the next available queue can be performed serially. In this case, one queue at a time is checked for occupancy (one or more clock cycles per queue). As the number of queues to be searched increases, the time to do the search also increases. For example, if it takes k cycles to check for occupancy of each queue, then the time to search through N queues in k×N clock cycles. For instance, if N is a million queues and k is 2 cycles, then it would take 2 million cycles to find the next queue in the worst case.

A search for the next available queue can be performed in parallel. A parallel circuit can be designed which accepts the entire state of the queues as its inputs. Such a circuit would have as its inputs, hundreds of thousands, or even millions, of signals corresponding to the occupancy status of the queues and a corresponding number of gates to determine the next non-zero queue. The cumulative gate delays through this logic may be considerable.

Moreover, some of the queues may be temporarily ineligible for service for any number of reasons including, but not limited to (a) the switch or router may employ a selective backpressure mechanism to flow-control specific queues, (b) the scheduling algorithm may exclude specific queues temporarily because they have met or exceeded performance targets; and (c) the switch may temporarily suspend service to queues that are in violation of performance criteria.

Furthermore, the state of one or more of the queues, empty or non-empty, may change during the process of searching through the queues. This is because the data coming into the queues is asynchronous with data being sent out of the queues. The eligibility status of individual queues may also change during the search.

BRIEF DESCRIPTION OF THE DRAWINGS

The features and advantages of the various embodiments will become apparent from the following detailed description in which:

FIGS. 14–16 illustrate exemplary schedules of operation for the exemplary cache registers of FIG. 7, according to one embodiment.

DETAILED DESCRIPTION

Figure 1:
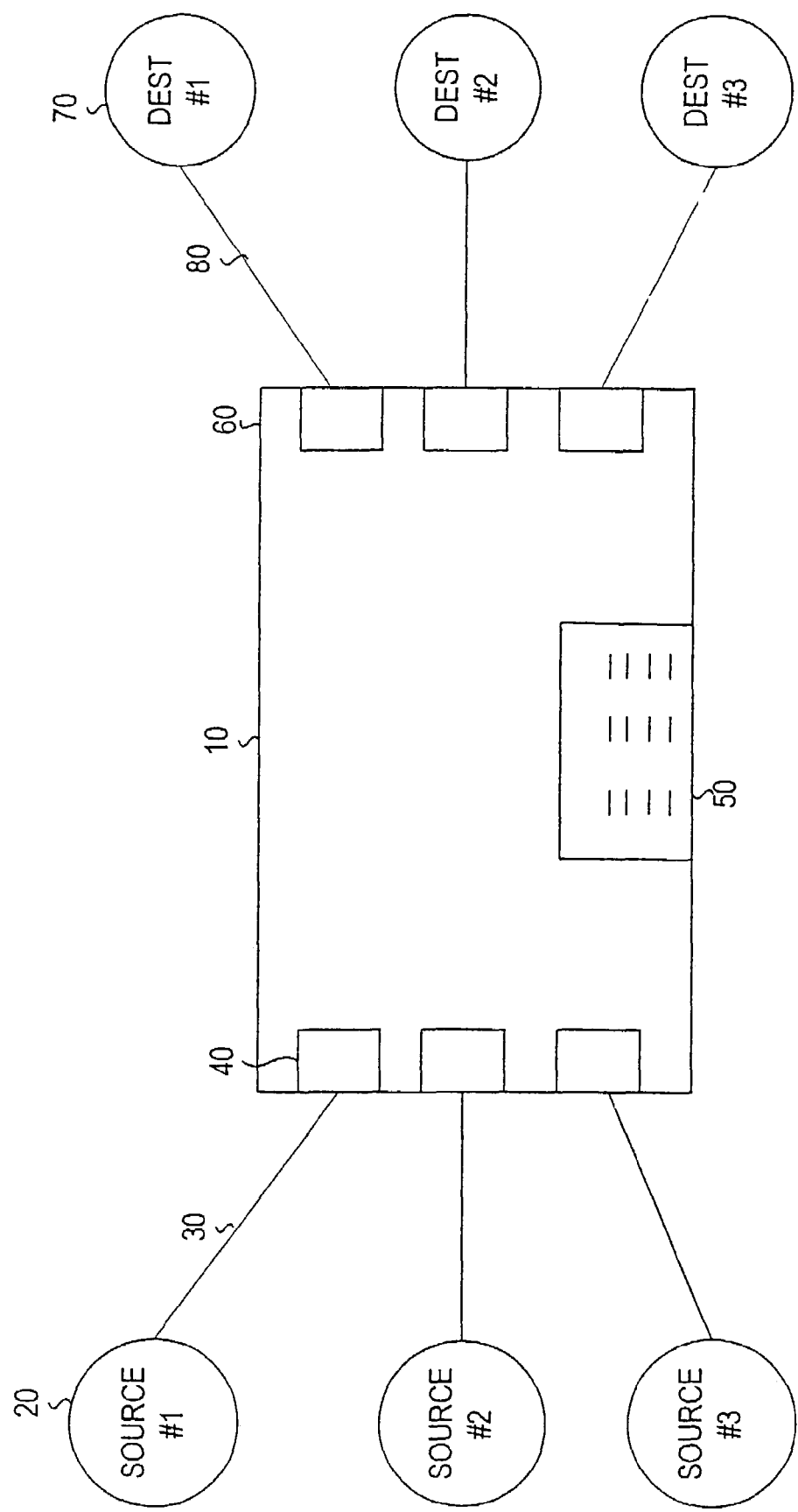
FIG. 1 illustrates an exemplary high-level diagram of a system utilizing a store-and-forward device.

FIG. 1 illustrates an exemplary high-level diagram of a system that includes a store and forward device, 10, such as a packet switch or a router used in communications systems. The device 10 receives data from multiple sources 20 (e.g., computers, other store and forward devices) over multiple communication links 30 (e.g., twisted wire pair, fiber optic, wireless). Each of the sources 20 may be capable of transmitting data at different speeds, different quality of service, etc. over different communication links 30. For example, the system may transmit the data using any number of protocols including Asynchronous Transfer Mode (ATM), Internet Protocol (IP) and Time Division Multiplexing (TDM). The data may be sent in variable length or fixed length blocks, such as cells, packets or frames.

The store and forward device 10 has a plurality of receivers (ingress modules) 40 for receiving the data from the various sources 20 over the different communications links 30. Different receivers 40 will be equipped to receive data having different attributes (speed, protocol, etc.). The data is stored in a plurality of queues 50 until it is ready to be transmitted. The queues 50 may stored in any type of storage device and preferably are a hardware storage device such as semiconductor memory, on chip memory, off chip memory, field-programmable gate arrays (FPGAs), random access memory (RAM), or a set of registers. The store and forward device 10 further includes a plurality of transmitters (egress modules) 60 for transmitting the data to a plurality of destinations 70 over a plurality of communication links 80. As with the receivers 40, different transmitters 60 will be equipped to transmit data having different attributes (speed, protocol, etc.). The receivers 40 are connected through a backplane (not shown) to the transmitters 60. The backplane may be electrical or optical. The receivers 40 and the transmitters 60 may be two sides of a line card. The line cards may be Ethernet (e.g., Gigabit, 10 Base T), ATM, Fibre channel, Synchronous Optical Network (SONET), and Synchronous Digital Hierarchy (SDH) amongst others.

Figure 2:
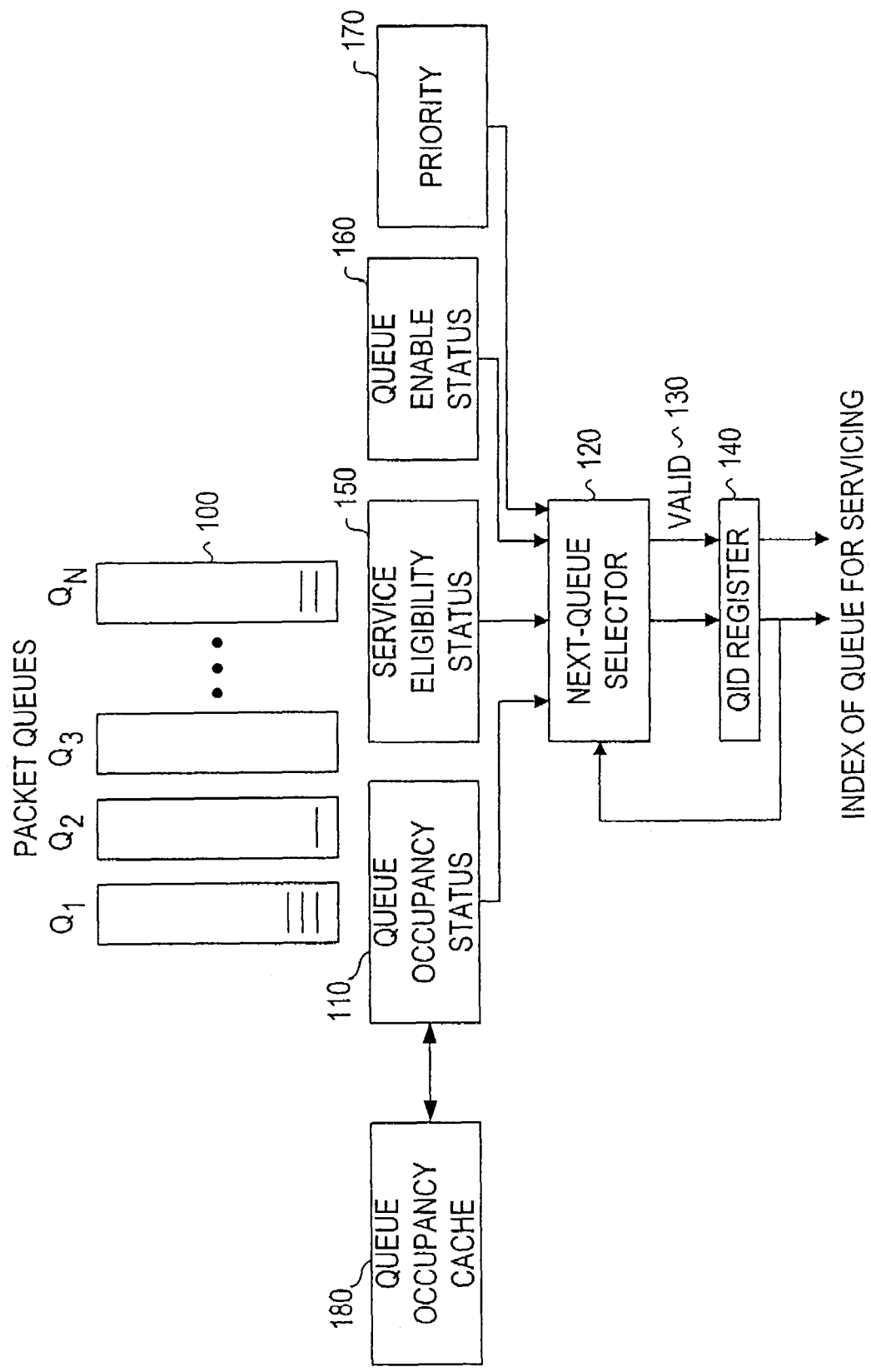
FIG. 2 illustrates an exemplary high-level block diagram, according to one embodiment.

FIG. 2 illustrates an exemplary high-level block diagram, according to one embodiment. Packets are stored in the set of queues 100 labeled $Q_1$ through $Q_N$. Each queue has a corresponding state (e.g., queue occupancy). The occupancy state may be stored in a first storage medium 110. The storage medium may be any type of storage device and preferably is a hardware storage device such as semiconductor memory, on chip memory, off chip memory, field-programmable gate arrays (FPGAs), random access memory (RAM), a set of registers, or other memory devices. The occupancy state may include a plurality of queue occupancy slots (e.g., bits, fields) indicating whether associated queues are empty or non-empty. Each queue should have an associated queue occupancy slot. According to one embodiment, each queue occupancy slot is a single bit. If the queue occupancy slot (single bit) is a '1' that indicates that the queue contains data (e.g., is non-empty) and a '0' indicates that the queue does not contain data (e.g., is empty). However, it is possible to establish the system so that a queue occupancy slot may use other values, as long as values are distinguish the "empty" and "not empty" states of the queue.

A queue ID (QID) register 140 stores the index of the current queue receiving service. This index is used by a next-queue selector 120 as the starting point for a new search, so that the queues 100 will be serviced in a round-robin order. The next-queue selector 120 receives, in each cycle, the current values of the queue occupancy slots. The search process starts at the queue after the current queue receiving service (the value in QID register) and wraps around back to the current queue. That is, if the current queue being serviced is $Q_K$, then queues $Q_{K+1}$, $Q_{K+2}$, ..., $Q_N$, $Q_1$, $Q_2$, ..., $Q_{K-1}$, $Q_K$ must be searched in that order to determine the next queue for service. The next queue selected for service must contain data (be non-empty) and accordingly have a '1' in its queue occupancy slot.

Once a next queue has been found, the next-queue selector 120 provides the index of the queue as its output to the QID register 140 and activates a valid slot 130 (e.g., sets to '1'). The new index is then written into the OID register 140. If on the contrary, there is no valid queue (non-empty), then the valid slot 130 is deactivated (e.g., set to '0'). A fresh search cycle can now be started, using the current queue index in QID register 140 as the starting point.

In alternative embodiments, the state of queues may include factors in addition to the occupancy state of the queue. For example, the state of the queue may define conditions such as service eligibility, enablement and priority.

The eligibility state may be stored in a second storage medium 150 containing service eligibility slots (e.g., slots, fields) used to mark the queues that are eligible for service. The service eligibility of a queue may be based on quality of service, destination, class of service, or other attributes. The service eligibility slots can be provided on an individual queue basis (one slot per queue), or on a group basis (one slot per group of queues, based on some grouping scheme). The service eligibility slots are used to temporarily exclude (e.g., mask out) specific queues from the search process. According to one embodiment, each service eligibility slot is a single bit. If the service eligibility slot is '1', the corresponding queue is (queues are) are service eligible and are included in the search process, and if the slot is 0, the corresponding queue is (queues are) not service eligible and are excluded from the search. It should be noted that the representation of the slots could be changed.

The enable state may be stored in a third storage medium 160 containing queue enable slots (e.g., bits, fields) used to optionally limit the search process to a specific subset of the queues $Q_1$ through $Q_N$. The enablement (or disablement) of specific queues may be performed by an entity, such as an Internet Service Provider (ISP), for any number of reasons, including disabling queues associated with a specific company, specific destination, or specific origination. The queue enable slots can be provided one slot per queue, or one slot per group of queues based on some grouping scheme. The queue enable slots are used to temporarily exclude (e.g., mask out) specific queues from the search process. According to one embodiment, each queue enable slot is a single bit. If the queue enable slot is '1', the corresponding queue is (queues are) enabled and included in the search process, and if the slot is 0, the corresponding queue is (queues are) not enabled and is excluded from the search. It should be noted that the representation of the slots could be changed.

The priority state may be stored in a fourth storage medium 170 containing priority slots (e.g., bits, fields) used to identify the priority associated with the queue. The priority may be based on quality of service or other factors. The number of priority levels would define how large the slot associated with each queue was. For example, if there were only two priority levels, a single bit could be used to define the priority levels. However, if there were more priority levels additional bits would be required (e.g., 4 levels would require 2 bits, 8 levels would require 3 bits). The priority level could be defined where the higher the priority level the more servicing the queue will be entitled to, or vice versa. The system may process only queues having a defined priority level (e.g., only level 1 queues when level 1 priority is being processed) or it may process all queues having at least a certain priority (e.g., all queues having level 1 priority or higher when level 1 priority is being processed).

The service eligibility, enablement and priority statuses may be added in any combination. The next queue selector 120 selects the next queue based on the various statuses it receives from the storage mediums 110, 150, 160, 170. In order for a queue to be considered for processing it must have the appropriate states from each associated storage medium for that queue. For example, if the next queue selector 120 receives an occupancy status and an eligibility status, the associated slots must indicate (e.g., set to '1') that the queue is non-empty and is eligible. If the next queue selector 120 received all four statuses then the occupancy, eligibility and enable must all be active (e.g., non-empty, eligible and enable accordingly) and the priority must be the highest among all the queues that are non-empty, eligible and enabled.

The various storage mediums 110, 150, 160, 170 may be separate storage devices, a single storage device or some combination thereof. If the storage devices are separate, each of the distinct storage devices may be the same type of storage device, may be different types of storage devices or some combination thereof.

The description above is based on the assumption that the status of the queues (e.g., the occupancy state, the eligibility status, the enable status, the priority) does not change during the search process. In practice, however, the status of one or more of the queues may change during the process of searching through the queues. For example, the occupancy status may change (e.g., empty to non-empty, non-empty to empty) because the data coming into the queues is asynchronous with data being sent out of the queues. The eligibility status (e.g., eligible to non eligible, non-eligible to eligible) may change because of quality of service issues. The enable status (enabled to non-enabled, non-enabled to enabled) may be changed by an external event (such as a service provider making policy changes), or by an internal event such as a flow-control event. The priority of the queues may also change in response to these events.

Due to the possibility of the various attributes changing during a search, the coherency of the data structures must be maintained during the search while the attributes are updated. The updates must also be performed concurrently with the search, so that they do not take cycles from the search process. According to a preferred embodiment, a search structure includes a caching scheme for maintaining coherency during update of the search state. If a queue is being used by the search hardware and its status changes (for any of the reasons discussed above) then a cache entry within the index of that queue is added (or modified) to reflect the change in the state of the queue. FIG. 2 illustrates a queue occupancy cache 180 associated with the queue occupancy status storage medium 110. A cache could also be associated with any combination of the additional status storage mediums 150, 160, 170.

The queue occupancy cache 180 (and/or any other caches utilized in the system) is operated in a write-through mode, and the information is updated in the queue occupancy status storage medium 110 (and/or in other associated storage mediums) at the end of each search cycle. The queue occupancy cache 180 includes of multiple registers (entries). Each register is divided into an address field, a data field, and a use field. The address field is used to identify the location (queue) in the queue occupancy status storage medium 110 where the cached data was read from. The data field contains the actual data read from the queue occupancy status storage medium 110. The data field can be modified and written back to the queue occupancy status storage medium 110. The use field is used to identify the process that is currently controlling the specific entry of the queue occupancy cache 180. There are four different processes that compete for access to the queues.

1. The search process (SEARCH) searches the queues (or queue status memories associated with the queue) to determine a next queue to service. If the queue is being modified when a search is to be conducted, the search may be conducted on the cache and then written back to the associated queue.

2. The insert process (INSERT) inserts packets into queues, which may cause the state of a queue to change from idle to active. If an INSERT operation is performed during a search, the modified queue state is written to the queue occupancy cache 180, and the cache writes the modified state to the queue occupancy status storage medium 110 at the end of the search.

3. The remove process (REMOVE) removes packets from the queues, which may cause the state of a queue to change from active to idle. If a REMOVE operation is performed during a search, the modified queue state is written to the queue occupancy cache 180, and the cache writes the modified state to the queue occupancy status storage medium 110 at the end of the search.

4. The enable process (ENABLE) changes the state of the Service Eligibility bits. If an ENABLE operation is performed during a search, the modified state of the Service Eligibility bits is written to a Service Eligibility cache, and the cache writes the modified state to the Service Eligibility status storage medium 150 at the end of the search.

Figure 3:
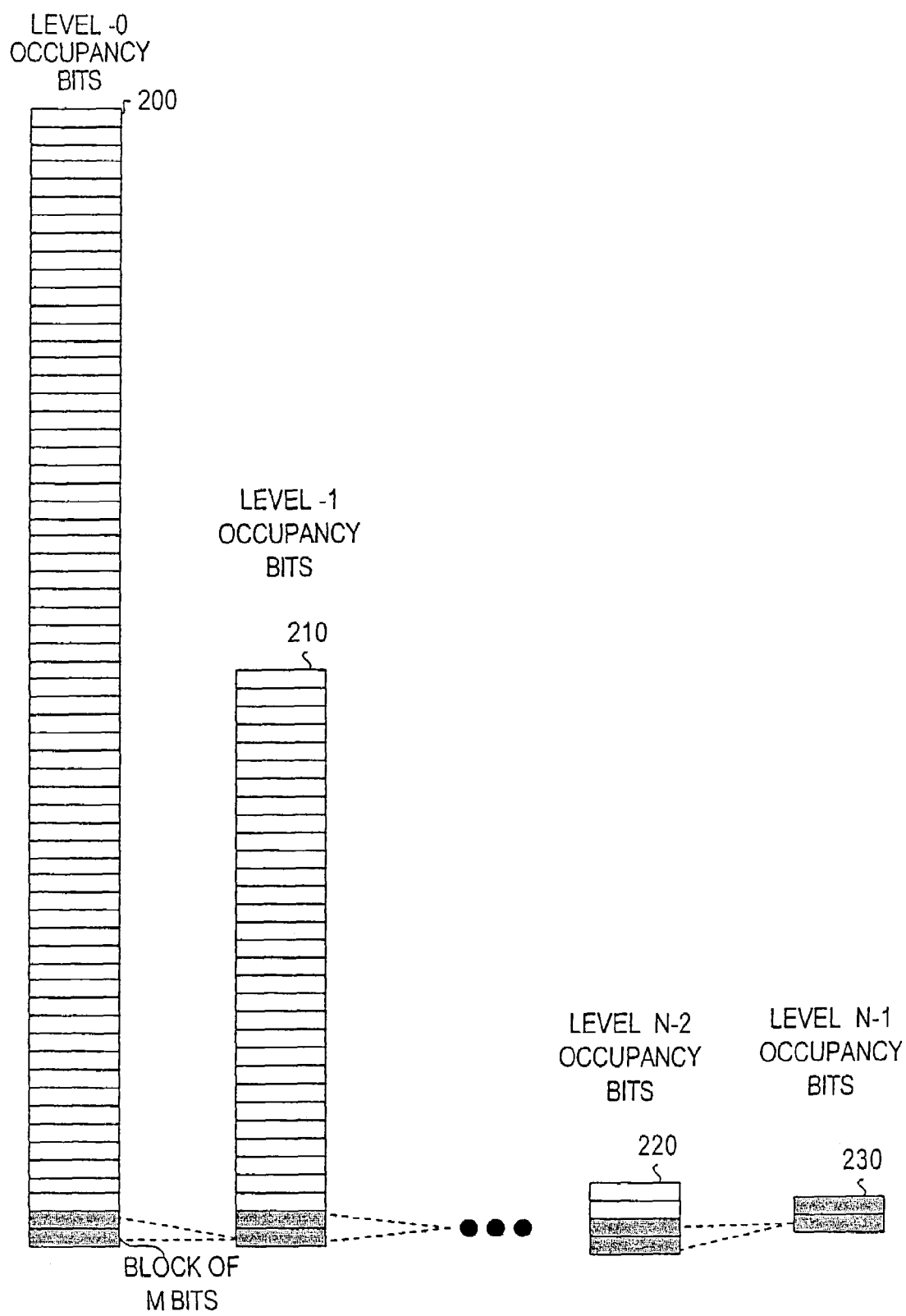
FIG. 3 illustrates an exemplary hierarchical structure, according to one embodiment.

The next-queue selector 140 may need to search through hundreds of thousands, or even millions, of queues to find the next queue for servicing. According to one embodiment, the queues are grouped into blocks, which in turn are grouped into bigger blocks, etc. FIG. 3 illustrates an exemplary block diagram of the grouping concept. The queue occupancy information for N queues is organized in a hierarchical data structure, including of n levels of state memories, labeled from 0 to n−1. For each of the n levels, there is a corresponding occupancy memory. The occupancy memory at each level is divided into blocks so that the search at each level can be confined within a block. The number of blocks in an occupancy memory at a given level of the hierarchy depends on the total number of queues N and an aggregation factor m (e.g., number of slots per block). A lowest level has a slot (e.g., bit, field) associated with each queue and the slots (e.g., bits, fields) are organized into blocks. At each higher level a single slot (e.g., bit, field) represents an entire block from the previous level.

The number of blocks at any level is determined by $m^{n-(x+1)}$, where x represents the level. As illustrated in FIG. 3, there are 64 queues (N=64), 6 levels (n=6), and there are 2 slots/block (m=2). At the lowest level (level 0) 200 there are a total of 64 slots organized into 32 blocks ($2^{6-(0+1)}$ or $2^5$) with each block having 2 slots. At the next higher level (level 1) 210 a single slot is associated with a particular block from the lowest level (level 0) 200. Level 1 has a total of 32 slots organized into 16 blocks ($2^{6-(1+1)}$ or $2^4$). At the second highest level (level n−2) 220 there are a total of 4 slots organized into 2 blocks ($2^{6-(4+1)}$ or $2^1$) with each block having 2 slots. At the highest level (level n−1) 230 the entire occupancy memory is organized as a single block ($2^{6-(5+1)}$ or $2^0$) of 2 slots. As illustrated, the number of slots in a block is always 2 (m=2), regardless of the level of the occupancy memory. A slot (bit) at a level k contains the aggregated occupancy information relating to a block containing m slots (bits) at a level k−1. That is, a slot having a '1' at level k indicates that there is at least one slot within the corresponding block at level k−1 that is a '1' (not specifically illustrated in FIG. 3).

Figure 4:
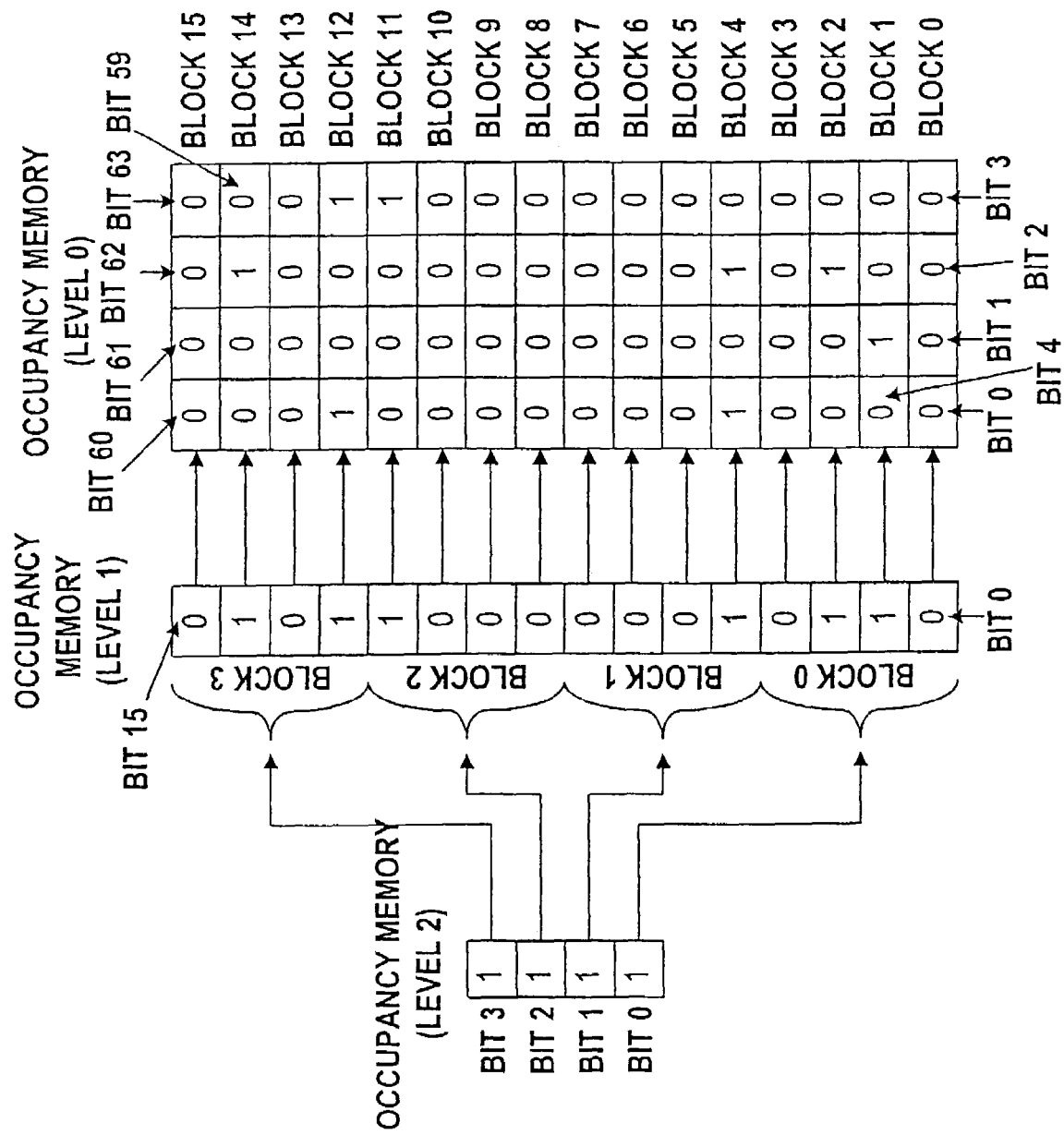
FIG. 4 illustrates an exemplary hierarchical queue occupancy memory structure, according to one embodiment.

FIG. 4 illustrates an exemplary hierarchical data structure where the number of queues N is 64, the number of levels n is 3, and the aggregation factor m is 4. The occupancy memory at level 0 contains one slot (e.g., bit, field) for each of the 64 queues (slots 0–63), organized into 16 blocks (blocks 0–15) with each block containing 4 slots (e.g., block 0 has slots 0–3, block 15 has slots 60–63). According to one embodiment (as previously noted), a '1' represents that the corresponding queue contains data (is non-empty) and a '0' represents that the corresponding queue is empty. The occupancy state for each of the level 0 blocks is summarized by a single slot at level 1 (accordingly there are 16 slots in the occupancy memory at level 1). For example, slot 0 of level 1 summarizes the aggregate occupancy state of block 0 (slots 0–3) in level 0. As there is no data (e.g., all 0s) in the slots 0–3 of level 0, slot 0 of level 1 is accordingly a '0'. The 16 slots (slots 0–15) in the occupancy memory at level 1 are grouped into 4 blocks (blocks 0–3) of 4 slots each. The occupancy state for each level 1 block is summarized by a single slot at the next level (level 2). For example, slot 0 of level 2 is a '1' because it summarizes the aggregate occupancy state of block 0 (slots 0–3) in level 0 of which slot 2 is a '1'. The occupancy memory at level 2 contains 4 slots (slots 0–3) organized as a single block. The exemplary hierarchical data structure of FIG. 4 only includes slots representing the queue occupancy state and does not include slots for the service eligibility state, the queue enable state or the priority. The incorporation of these slots into the hierarchical data structure will be discussed later.

Figure 5:
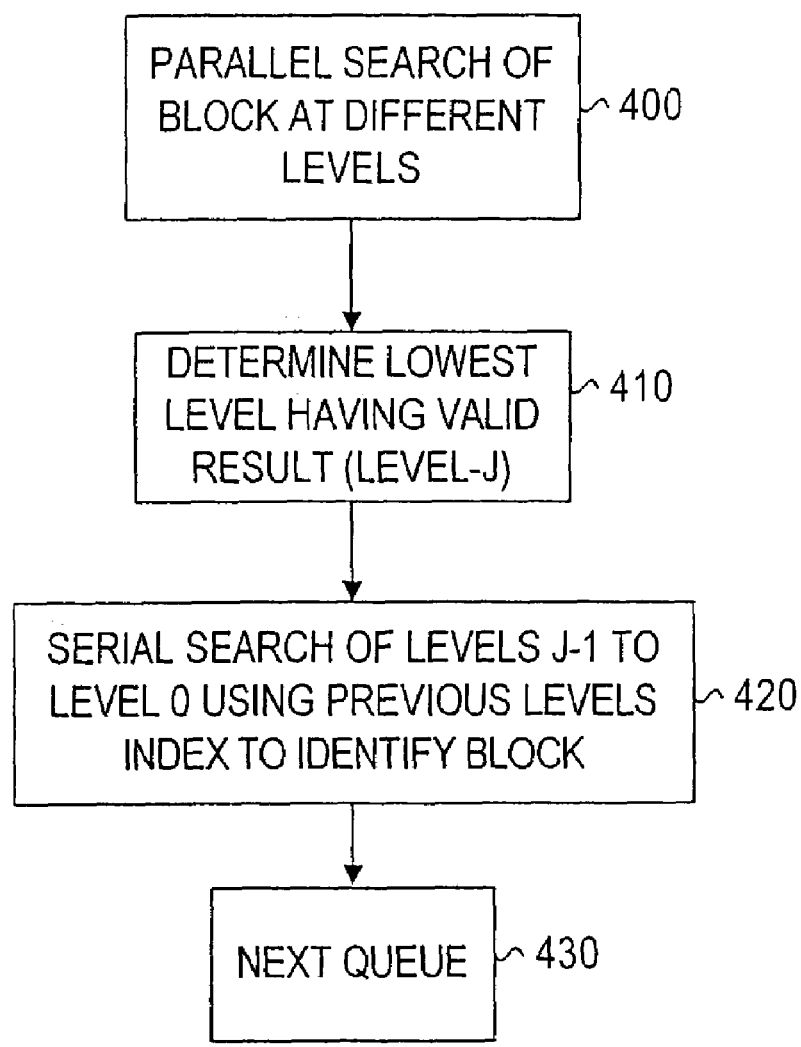
FIG. 5 illustrates an exemplary method used to find the next queue for servicing, according to one embodiment.

FIG. 5 illustrates an exemplary flow chart of a procedure to find the next queue for servicing. For simplicity, we assume that the search needs to examine only the queue occupancy state. A search is performed at each of the levels (level 0 through level n−1) of the hierarchical data structure to find the next qualifying (e.g. non-zero) index within the current block at that level (400). For all the levels except the highest level (level n−1), the search 400 starts at the slot after the position of the current queue being serviced and proceeds through the entries within that block in increasing order of their indices. That is, the entries within that block above the position representing the currently serviced queue (e.g., higher indices) are searched while the currently serviced queue and the entries below that (e.g., lower indices) are not searched. For the highest level (level n−1), the search 400 starts at the next position above the position representing the currently serviced queue, then wraps around to index 0 and proceeds in increasing order of the index to the position of the current queue. This is necessary to achieve the round-robin order of servicing the queues.

The searches 400 at all the n levels can be done in parallel, since the results of a search at any one level of the hierarchy do not affect the search parameters at another level of the hierarchy. Also, because the search 400 is performed in parallel, the time required to do the search is a constant, independent of the number of levels in the hierarchy. The search 400 completes at each level with either (a) a qualifying entry (non-empty queue) found within the block at that level, or (b) no qualifying entry found (all queues in the search area are empty). Note that, at the highest level (level n−1), the search 400 is guaranteed to find a qualifying queue if there is at least one such queue in the system. The search 400 of level n−1 will result in no qualifying entry only if there is no qualifying queue in the entire system.

After the parallel search 400 described above is completed, a determination (in serial) 410 is performed starting from level zero, and going up through the levels to find the first level at which the search 400 produced a valid result (e.g., non-empty queue). The determination 410 stops at the lowest level where the parallel search 400 yielded a qualifying entry (let j be this level).

When determination 410 finds a valid entry at level j, a new search 420 is initiated at each of the levels lower than j. This sequence of searches must be done serially, starting from level j−1, and proceeding through the lower levels, until level 0. At each level, the position of the qualifying entry from the previous level is used as the block number where the search is performed. This block is searched in the order from the lowest position to the highest position, to determine the index of the first non-empty queue. This index then becomes the block number for the search at the next lower level, and so on, until level 0 is searched. The search finally leads to an index at level 0.

The set of indices from level n−1 through level j determined in the search 400 together with the set of indices from level j−1 to level 0 determined in the search 420 constitute the queue number of the queue that needs to be serviced next 430. These indices are stored to be used as the starting indices for the next search The search operation at any level is limited to the slots within a single block. Thus, the search at each level can be accomplished by a simple priority encoder circuit. Only a single such priority encoder is required at each level, regardless of the number of blocks in the occupancy memory at that level, because the method searches no more than one block at each level at a given time. A fast hardware priority encoder circuit can be used to search a large number of queues (e.g., millions) if the size of the blocks where searches are conducted is kept small enough (e.g., tens of bits).

It should be noted that although we assumed the aggregation factor m to be the same at each level, it is possible to use a different value for the aggregation factor at each level. This only changes the size of the blocks and the number of blocks in the occupancy memory at a specific level, but does not change the search method.

Figure 6:
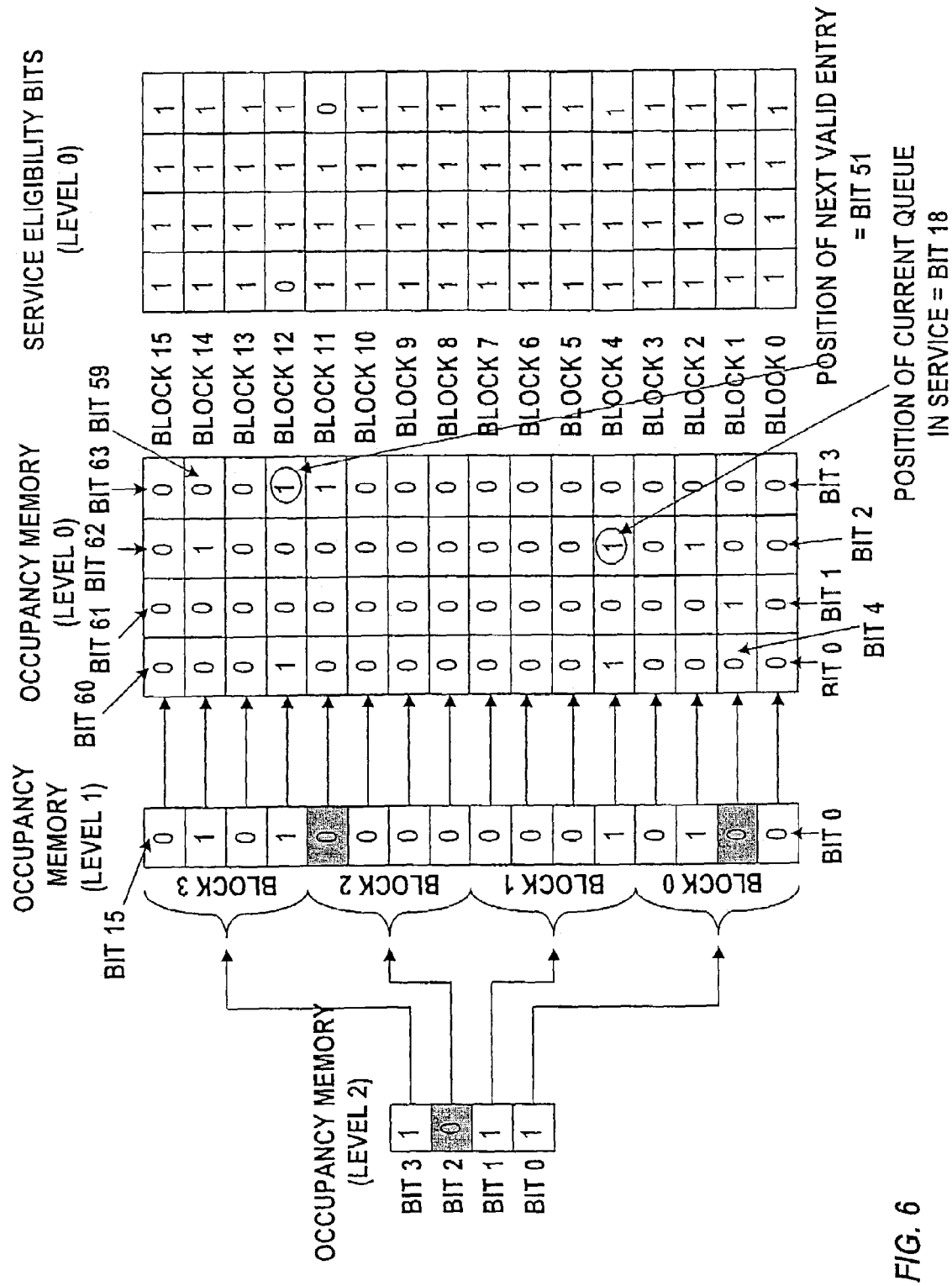
FIG. 6 illustrates an exemplary hierarchical queue occupancy memory structure and service eligibility memory, according to one embodiment.

FIG. 6 illustrates an exemplary hierarchical data structure similar to the exemplary hierarchical data structure in FIG. 4 in that the number of queues N is 64, the number of levels n is 3, and the aggregation factor m is 4. However, in this exemplary embodiment the hierarchical data structure also includes a service eligibility slot for each queue (most flexible masking option). In this embodiment, the array of service eligibility slots are stored in a similar fashion to the array of occupancy slots at level 0. While the number of service eligibility slots is illustrated as matching one-for-one with the number of queues, it is not limited thereto. Rather, there can be service eligibility slots at one or more levels of the hierarchy. An entire subtree can be excluded from the search by setting a service eligibility slot corresponding to the subtree to '0'. For example, a single slot at level 1 can be used to enable or disable all the entries (slots) of a corresponding block at level 0.

A queue can be selected for service only if the corresponding level 0 occupancy slot and the service eligibility slot are both '1'. The state of each block at level 0 is summarized by a single slot at level 1. The slot in level 1 occupancy memory is '1' only if there is at least one valid queue (both occupancy and eligibility are '1') that can be selected for service within the corresponding block of level 0. For example, slot 2 of level 1 is '1' because slot 10 of level 0 has a '1' for both occupancy and eligibility. To the contrary, slot 1 of level 1 is '0' even though slot 5 of level 0 is '1' because the corresponding eligibility slot is '0'. In fact, for block 1 of level 0 the occupancy slots and the eligibility slots for each of the slots are opposite of each other. The summary slots in level 1 occupancy memory can be generated by performing a simple logic operation on the slots in the corresponding block in level 0 occupancy memory and the corresponding service eligibility slots. That is, the occupancy memory slot in level 1 can be generated by first logically slotwise ANDing the 4 slots of block i in level 0 with the corresponding service eligibility slots, and subsequently ORing the four slots generated by the AND operation. The level 1 and level 2 slots that changed from FIG. 4 based on the addition of the eligibility slots are shaded.

The process defined in FIG. 5 will now be applied to the hierarchical data structure of FIG. 6. The last queue serviced in FIG. 5 was queue 18 which has an index of $I_2=1$, $I_1=0$, and $I_0=2$. Accordingly, the parallel search 400 would start at slot 2 (next slot) for level 2, slot 1 (next slot) of block 1 for level 1, and slot 3 (next slot) of block 4 for level 0. The level 2 search would proceed to slot 3 and then wrap around to slots 0 and 1. The level 2 search would find a valid slot at slot 3 and according would activate a valid entry (e.g., set to '1'). The level 1 search would continue to slots 2 and 3 of block 1. The level 1 search would not find any valid slots and accordingly would not activate a valid entry (e.g., set to '0'). The level 0 search 605 would only search slot 3 (first and last slot) of block 4. The level 0 search would not find any valid slots and accordingly would not activate a valid entry (e.g., set to '0').

Next a determination 410 is made as to what is the lowest level having a valid entry. The lowest level j is level 2 (j=2). A search 420 is then performed on level 1. The block searched for level 1 is defined by the indices ($I_{n-1}, I_{n-2}, \ldots I_{j+1}$), which in this case is simply $I_2=3$. The search of level 1 block 3 yields a valid entry in slot 0 (level 1 slot 12) so that the valid entry is set. A search 420 is then performed on level 0. The block searched for level 0 is defined by the indices ($I_{n-1}, I_{n-2}, \ldots, I_{j+1}$), which in this case is $I_2=3, I_1=0$. The block to be searched for level 0 is determined by multiplying the index (slot number) from each level by an appropriate multiplier and then adding all the multiplied indices together. The appropriate multiplier for the level 2 index is 4 as each level 2 slot covers 4 level 0 blocks (3*4), the appropriate multiplier for the level 1 index is 1 as each level 1 slot covers 1 level 0 block (0*1), so that the level 0 block is 12, ((3*4)+(0*1)). The search of the level 0 block 12 yields a first non-empty slot at slot 0, however slot 0 is not service eligible and is thus not a valid entry. The next non-empty slot is slot 3 that is also service eligible so it is the first valid slot. As a valid slot was found the valid entry for level 0 is activated. The slot number of the next available queue 430 that was selected by the search can be determined by multiplying the index (slot number) from each level by an appropriate multiplier and then adding all the multiplied indices together. The appropriate multiplier for the level 2 index is 16 as each level 2 slot covers 16 queues (3*16), the appropriate multiplier for the level 1 index is 4 as each level 1 slot covers 4 queues (0*4) and the appropriate multiplier for the level 0 index is 1 as each level-0 slot covers a single queue (3*1), so that the overall result is slot 51, ((3*16)+ (0*4)+(3*1)). The next available queue is then recorded in the QID. In the example of FIG. 6 the current queue being serviced is queue 18 (identified by slot 18) and the next available queue is queue 51 (identified by slot 51).

The exemplary embodiments of FIGS. 4 or 6 could be modified to add any combination of enablement, priority or other statuses to individual queues, blocks of queues or both.

Figure 7:
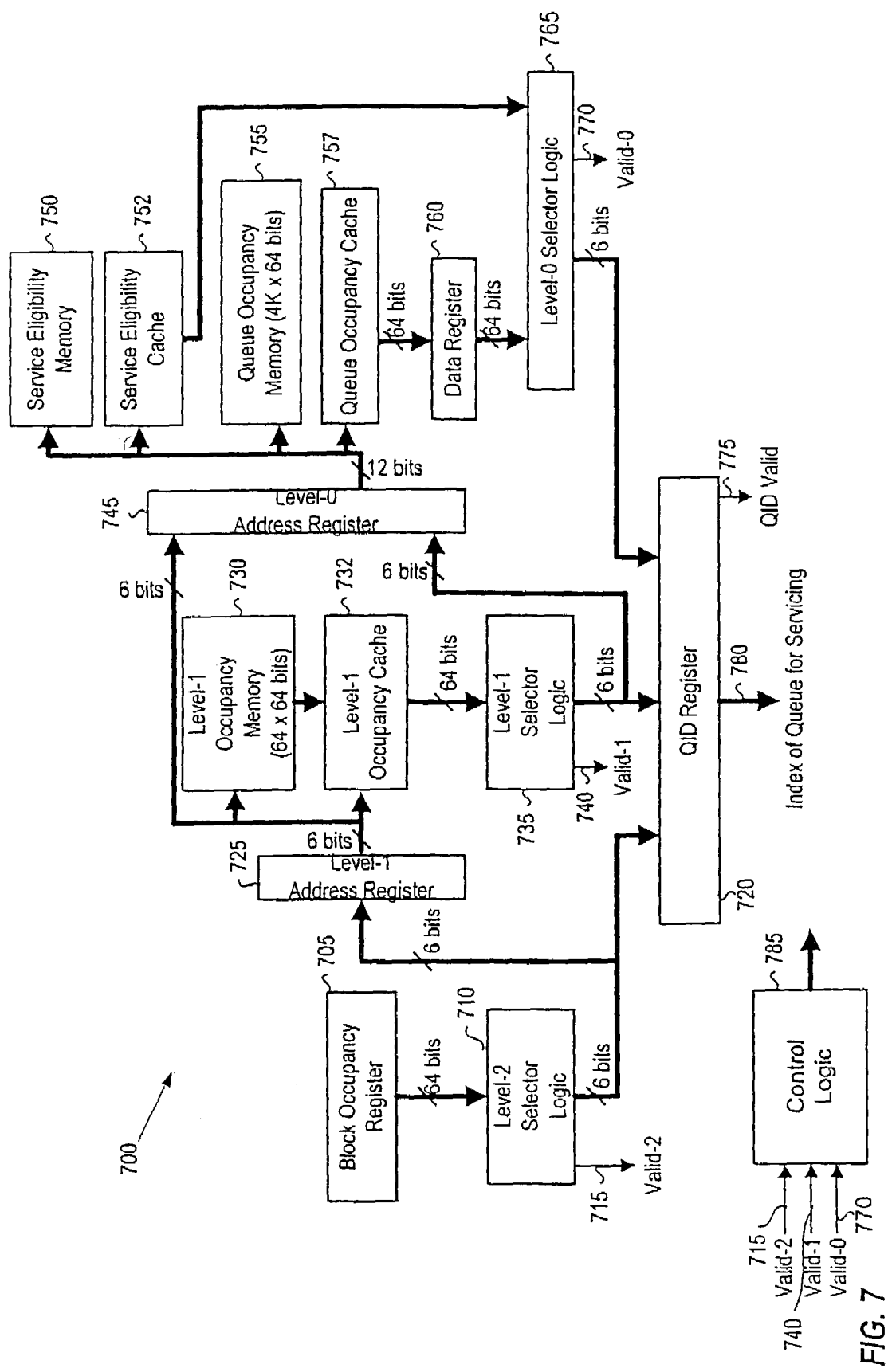
FIG. 7 illustrates an exemplary block diagram of a hardware embodiment for round-robin searching a large number of queues, according to one embodiment.

FIG. 7 illustrates and exemplary block diagram of a hardware embodiment 700 of the scheme for fast searching of a large number of queues in a round-robin order. This embodiment includes occupancy and eligibility status for each queue. Alternative embodiments could include enable and priority status. The exemplary block diagram is based on a queue of 262,144 ($2^{18}$), which for simplicity will be referred to as a total of 256K (where K=1024) queues (N=256K). The hierarchical search is organized in three levels (n=3), and each block has 64 slots (m=64). Accordingly, the lowest level (level 0) of the hierarchical search structure will have a slot for each of the 256K queues (256K slots) divided into 4K blocks of 64 slots each. Level 1 will have 1 slot for each of the 4K level 0 blocks (total of 4K slots) divided into 64 blocks each having 64 slots. Level 2 will have 1 slot for each of the 64 level 1 blocks (total of 64 slots) in a single block having 64 slots. It should be noted that these values are only for illustration. The number of queues and the number of levels can be chosen based on the requirements of the system.

The level 2 hierarchy includes a block occupancy register 705 containing the status of each slot (64) in the block. Each slot represents the aggregated status of a level 1 block of 64 slots. The register 705 sends the 64 slots to a level 2 selector logic 710 for detecting the next valid entry (assuming there is one). The selector 710 will search the slots in order will set a valid-2 slot 715 on (e.g., '1') if there is a valid entry at this level. As previously discussed the search would start with the next current slot continue to the last slot, then wrap around to first slot, and end on current slot. The details of the level 2 selector logic 710 will be illustrated separately in more detail in FIG. 8. The index of the next valid slot will be sent to a QID register 720. As illustrated, the index being sent to the QID register is 6 bits as that is the number of bits necessary to identify which, if any, of the 64 level 2 slots (0–63) is the next valid slot. The level 2 next valid slot index (6 bits) will also be sent to a level 1 address register 725.

The level 1 hierarchy includes a level 1 occupancy memory 730 that includes a total of 64 blocks with each block containing 64 slots. Each slot represents the aggregated status of a level 0 block of 64 slots. The level 1 hierarchy also includes a level 1 occupancy cache 732 to record changes in the status of the level 1 occupancy memory 730 that happen during a search cycle of those particular queues. The level 1 occupancy memory 730 and the level 1 occupancy cache receive an input from the level 1 address register 725. For the parallel search (400 of FIG. 5), the input is the block number of the most recently serviced queue. For the serial search (420 of FIG. 5), the input is the next valid slot found in a level 2 parallel search, which identifies the appropriate block of level 1 to be searched. The level 1 occupancy memory 730 transmits the appropriate block of 64 slots to a level 1 selector logic 735 if no search is being performed on that block. The level 1 selector logic 735 will search the slots in order and will set a valid-1 slot 740 on (e.g., '1') if there is a valid entry at this level. As previously discussed, the parallel search starts with the next current slot in the block and continues to the last slot. The serial searches look at the entire block of slots from the first slot to the last slot. The details of the level 1 selector logic 735 will be illustrated separately in more detail in FIG. 9. The index (6 bits) of the next valid slot will be sent to the QID register 720. The level 1 next valid slot index as well as the level 2 next valid slot index that was stored in the level 1 address register are sent to a level 0 address register 745.

The level 0 hierarchy includes a service eligibility memory 750 to hold the service eligibility slots for the queues, a service eligibility cache 752 to record changes in the status of the service eligibility memory 750 that happen during a search cycle of those particular queues, a queue occupancy memory 755 to hold the occupancy slots for the queues, and a queue occupancy cache 757 to record changes in the status of the queue occupancy memory 755 that happen during a search cycle of those particular queues. The service eligibility memory 750 can be organized based on the level of granularity desired for the service eligibility information. The most general implementation will have 1 slot for every queue so that the service eligibility memory 750 can be organized identical to the queue occupancy memory 755. When a slot in the service eligibility memory 750 is set (e.g., '1'), the corresponding slot(s) in the queue occupancy memory 755 are included in the search. When a slot in the service eligibility memory 750 is not set (e.g., '0'), the corresponding slot(s) in the queue occupancy memory 755 are excluded from the search. Alternatively, the service eligibility memory 750 may provide one slot for a block of queues (for example, one slot for every 64-slot word of the queue occupancy memory 755). If the service eligibility memory 750 has a single slot associated with an entire level 0 block (e.g., a level 1 slot), the service eligibility memory 750 may be located in the level 1 hierarchy.

The level 0 address register 745 provides the index of level 2 (6 bits) and level 1 (6 bits) to the service eligibility memory 750, the service eligibility cache 752, the queue occupancy memory 755, and the queue occupancy cache 757. The indexes may be based on the most recently serviced queue for the parallel searches (400 of FIG. 5) or the next valid slot found in the appropriate serial searches from the higher levels (level 2 and level 1) for the serial search (420 of FIG. 5). The queue occupancy memory 755 (via the queue occupancy cache 757) provides the appropriate block (64 slots) to a data register 760. A level 0 selector logic 765 receives the slots from the appropriate block from the data register 760 as well as receiving the appropriate block (64 slots) from the service eligibility memory 750 (via the service eligibility cache 752). The level 0 selector 765 selects the next valid slot from the level 0 block provided. As previously discussed, the parallel search starts with the next current slot in the block and continues to the last slot. The serial search looks at the entire block of slots from the first slot to the last slot. The level 0 selector logic 765 will set a valid-0 slot 770 on (e.g., '1') if there is a valid entry within the specified block at this level. The details of the level 0 selector logic 765 will be illustrated separately in more detail in FIG. 10. The index (6 bits) of the next valid slot will be sent to the QID register 720.

If the QID register 720 has a next valid slot the QID register activates (e.g., sets to '1') a QID valid slot 775. The QID valid slot 775 will be active as long as there is at least one valid slot in the entire queue, and will only be inactive (e.g., set to '0') if there are no valid slots in the entire queue. The next valid slot (index of the next queue for servicing) 780 is determined by utilizing the next valid slot index from each of the levels together. That is, the least significant 6 slots come from the 6-slot output of the level 0 selector logic 765, the next higher 6 slots are from the 6-slot output of the level 1 selector logic 735, and the most significant 6 slots are from the level 2 selector logic 710. The level 2 index would be multiplied by 4K since each slot represents 4K queues, the level 1 queue would be multiplied by 64 since each level 1 slot represents 64 queues, and each level 0 index would be multiplied by 1 as each slot represents a queue.

A control logic (e.g., processor) 785 controls the operation of the device 700 (e.g., performs the process defined in FIG. 5). The control logic 785 receives the valid-x bits 715, 740, 770 from each level to determine what levels have valid queues identified.

It should be noted that FIG. 7 illustrates the exemplary hardware embodiment as individual operational blocks for clarity of explanation. A separate device may be utilized to perform each operation, a single device may perform multiple operations, several devices may be required to perform a single operation, or some combination thereof. For example, a single storage medium may be used to perform the operations of all of the registers 705, 725, 745, 760, memories 730, 750, 755, and caches 732, 752, 757 of FIG. 7. A single priority encoder may be used to perform the operation of each of the selector logics 710, 735, 765. Very Large Scale Integration (VLSI) hardware embodiments, as well as custom VLSI circuits implementing the operational blocks may be utilized. Field-programmable gate arrays (FPGAs), or other programmable logic devices, possibly in combination with read-only memory or random-access memory, may also be used to implement the operational blocks. The control logic 785 may be shared or dedicated hardware, including, but not limited to, hardware capable of executing software, a microprocessor and/or digital signal processor hardware, read-only memory (ROM) or random-access memory (RAM) for storing software performing the operations discussed with respect to FIG. 5.

The entire search operation for the illustrative embodiment of FIG. 7 can be completed in 4 phases (number of levels, n,+1), executed sequentially. These 4 phases can be individual clock cycles, or the four phases of a 4-phase clock. The QID register 720 holds the index of the current queue in service. It is updated at the end of Phase 4 to the new entry found by the search. The level 0 address register 745 and the level 1 address register 725 hold the addresses of the current words in the queue occupancy memory 755 and the level 1 occupancy memory 730, respectively, which are also updated during the search. The following processing occurs in each phase.

Phase 1: The three selector logic blocks 710, 735, 765 concurrently search for the next valid entry (1 slot) in the current word (block) at the respective levels of the hierarchy (e.g., 400 of FIG. 5). If the level 0 selector logic 765 finds a valid slot in the word (block) to the right of the current slot position it sets the valid-0 output 770 to '1'. For a slot to be considered valid it must have a '1' for both the queue occupancy memory 755 and the service eligibility memory 750 as the associated slots are ANDed together. If no valid entry is found in the level 0 word (block) to the right of the current slot position, the level 0 selector logic 765 deasserts its valid-0 output 770. If the level 1 selector logic 735 finds a valid slot in the word (block) to the right of the current slot position it sets the valid-1 output 740 to '1' and sets the valid-1 output to '0' if no valid entry is found. If the level 2 selector logic 710 finds a valid slot in the word (block) it sets the valid-2 output 715 to '1' and sets the valid-2 output to '0' if no valid entry is found. As previously discussed the valid-2 output will be '0' only if there is no valid queue in the entire system.

A determination is then made as to what the lowest level having a valid slot is. Initially the valid-0 slot 770 is examined. If the valid-0 slot 770 is set to '1' the address of the slot (encoded in 6 bits) is set as the index $I_0$ for level 0. In this case, it is not required to examine the next levels (e.g., level 1 or level 2) and no action is needed in Phases 2 and 3. Only the 6 least significant slots of the QID register 720 are updated to reflect the 6-slot output of the level 0 selector logic 765.

If the valid-0 slot 770 is set to '0', the valid-1 slot is examined. If the valid-1 slot 770 is set to '1' the address of the slot (encoded in 6 slots) is set as the index $I_1$ for level 1. In this case, it is not required to examine the next level (e.g., level 2, the block occupancy register 705) and no action takes place in Phase 2. Phase 3 uses the result of the level 1 selector logic 735 to search the queue occupancy memory 755 (level 0), as described below.

If the valid-1 slot 740 is set to '0', the valid-2 slot is examined. If the valid-2 slot 715 is set to '1' the address of the slot (encoded in 6 bits) is set as the index I2 for level 2. The appropriate level 2 slot is read into the level 1 address register 725. Phase 2 uses the result of the level 2 selector logic 710 stored in the level 1 address register 725 to search the level 1 occupancy memory 730 (described below).

If the valid-2 slot 715 is '0', there is no valid queue in the entire system that is eligible for service.

Phase 2: No action takes place in Phase 2 if either valid-0 or valid-1 is asserted (e.g., set to '1') at the end of Phase 1. Otherwise, the level 1 address register 725 is used to identify which level 1 block is going to be searched. The level 1 selector logic 735 searches the appropriate block. If a valid slot is found in the level 1 block the valid-1 output 740 is activated and the address of the slot (encoded in 6 bits) is set as the index $I_1$ for level 1. The appropriate level 1 slot as well as the appropriate level 2 slot (12 bits total) is read into the level 0 address register 745. Phase 3 uses the result from the level 2 selector logic 710 and the level 1 selector logic 735 stored in the level 0 address register 745 to search the queue occupancy memory 755 (described below).

If no valid entry is found in the level 1 search (e.g., no slot having a '1') the process concludes and a determination is made that there are no valid queue.

Phase 3: No action is necessary if valid-0 is asserted in Phase 1. Otherwise, the level 0 address register 745 is used to identify which level 0 block is going to be searched. The appropriate word (block) from the queue occupancy memory 750 is read into the data register 760, which provides it to the level 0 selector logic 765 in phase 4.

Phase 4: The data register 760 is used to identify which level 0 block is going to be searched. The level 0 selector logic 765 searches the appropriate block. If a valid slot is found in the level 0 block the valid-0 770 output is activated and the address of the slot (encoded in 6 bits) is set as the index $I_0$ for level 0. At the end of Phase 4, the QID register 720 is updated from the results provided by the selector logic blocks 710, 735, 765 (6 bits each). The QID register 720 now identifies the queue that will be serviced next. This index will now be used as a starting point for identifying the next available queue.

If no valid entry is found in the level 0 search (e.g., no slot having a '1') the process concludes and a determination is made that there are no valid queue.

Figure 8:
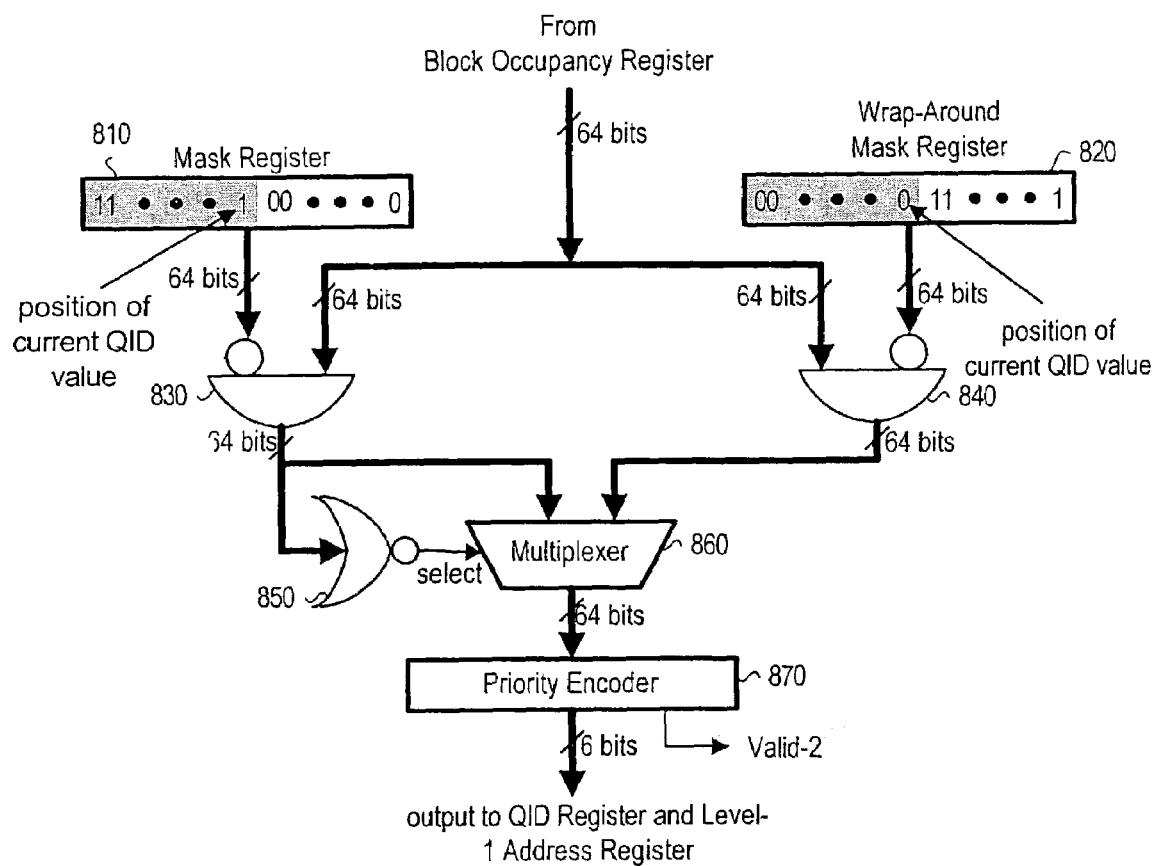
FIG. 8 illustrates an exemplary block diagram of the level 2 selector logic of the exemplary hardware embodiment of FIG. 7, according to one embodiment.

FIG. 8 illustrates an exemplary block diagram of the level 2 logic selector of FIG. 7. A mask register 810 marks (sets to '1') all of the slots in the block up to and including the slot representing the currently serviced queue. A wrap-around mask register 820 marks (sets to '1') all of the slots after the slot representing the queue currently being serviced. The results of the mask register 810 as inverted and provided to an AND gate 830 along with the data from the block occupancy register. The result of the AND gate 830 would be to mask (zero out) all slots prior to the slot representing the currently serviced queue. The results of the wrap-around register 820 is inverted and provided to an AND gate 840 along with the data from the block occupancy register. The result of the AND gate 840 would be to mask (zero out) all slots after the current slot being serviced. Alternately, the mask register 810 and the wrap-around mask register 820 could mark the appropriate slots by setting them to '0', in which case the outputs would not need to be inverted prior to supplying to the AND gates 830, 840.

The results from the AND gates 830, 840 are provided to a multiplexer 860. The output of the AND gate 830 is also provided to a NOR gate 850. The output of the NOR gate 850 being used to select the appropriate slots from the multiplexer 860. That is, if one or more of the slots to the right of the current slot is a "1", the NOR gate 850 makes the multiplexer 860 select its left input of 64 bits, thus narrowing the search to the slots to the right of the current slot. In contrast, if all the bits to the right of the current slot are "0", the NOR gate 850 sets the multiplexer 860 to select the right input of 64 bits, thus confining the search to the slots to the left of, and including, the current slot. The multiplexer 860 provides the appropriate slots to a priority encoder 870. The priority encoder 870 searches the slots provided. If a valid slot is found the priority encoder 870 activates the valid-2 slot and provides the address (6 slots) of the next available slot to the QID.

Figure 9:
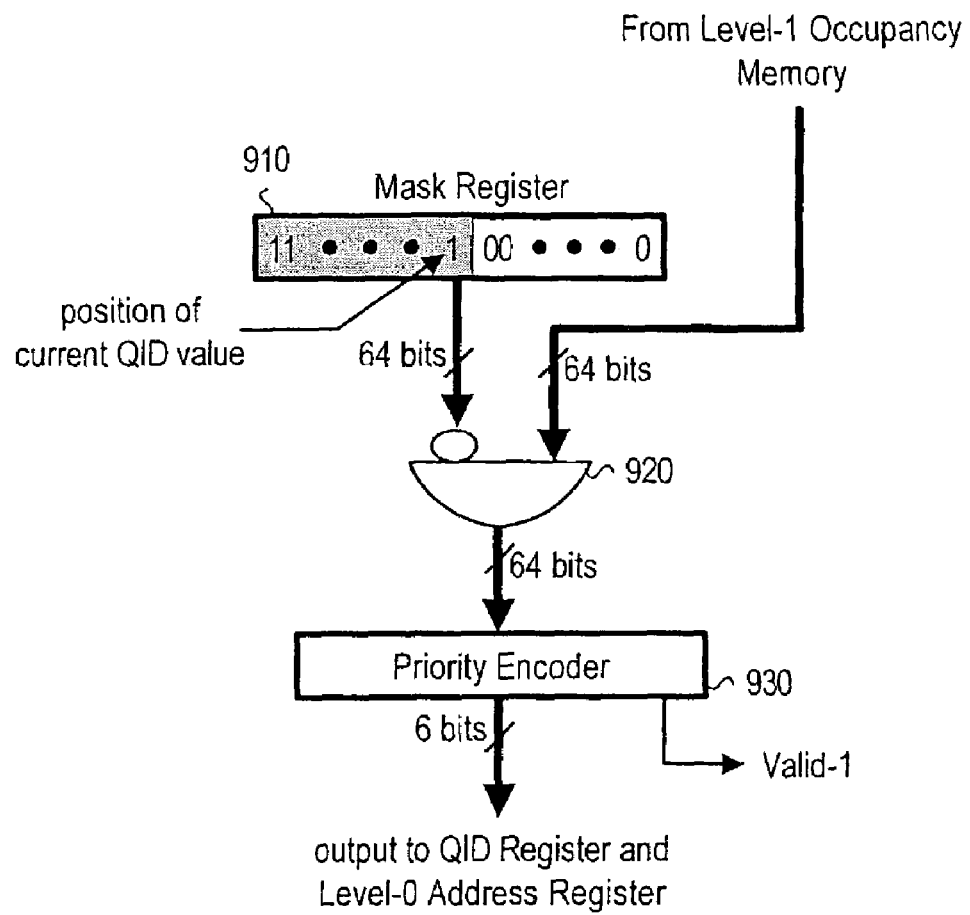
FIG. 9 illustrates an exemplary block diagram of level 1 selector logic of the exemplary hardware embodiment of FIG. 7, according to one embodiment.

FIG. 9 illustrates an exemplary block diagram of the level 1 logic selector of FIG. 7. A mask register 910 marks (sets to '1') all of the slots in the block up to and including the slot representing the currently serviced queue. The results of the mask register 910 are inverted and provided to an AND gate 920 along with the data from the level 1 occupancy memory.

The result of the AND gate 920 would be to mask (zero out) all slots up to and including the currently serviced slot. Alternately, the mask register 910 could mark the appropriate slots by setting them to '0', in which case the output would not need to be inverted prior to supplying to the AND gate 920. The results from the AND gate 920 are provided to a priority encoder 930. The priority encoder 930 searches the slots provided. If a valid slot is found the priority activates the valid-1 slot and provides the address (6 bits) of the next available slot to the QID.

Figure 10:
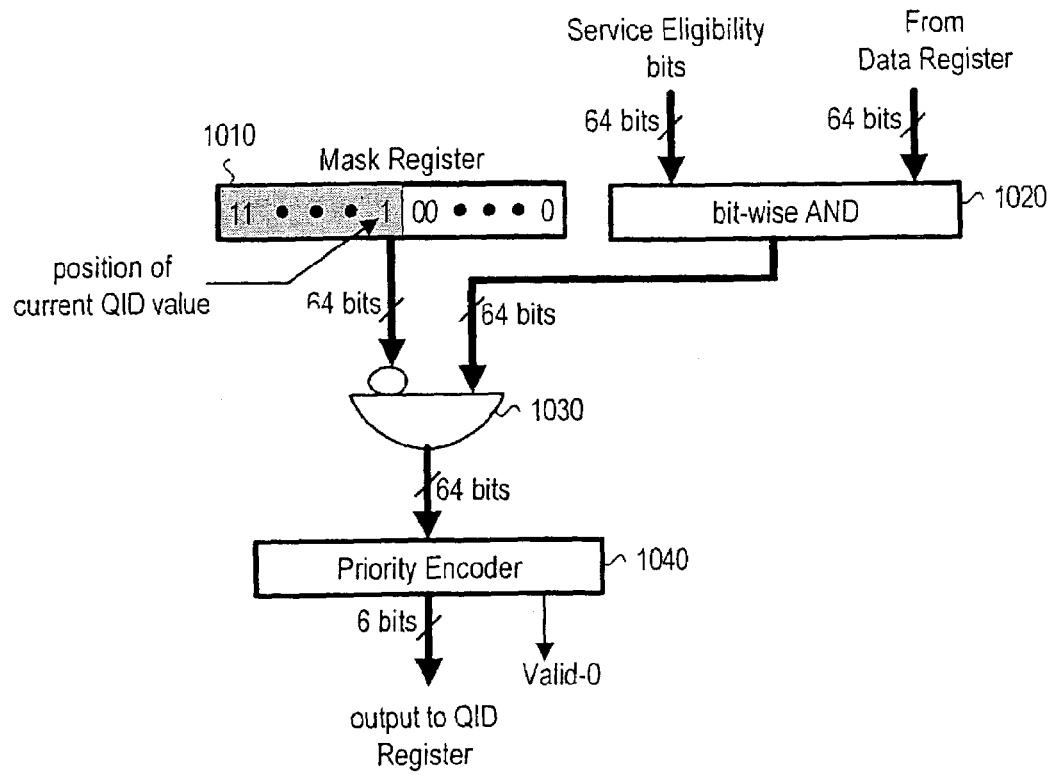
FIG. 10 illustrates an exemplary block diagram of the level 0 selector logic of the exemplary hardware embodiment of FIG. 7, according to one embodiment.

FIG. 10 illustrates an exemplary block diagram of the level 0 logic selector of FIG. 7. A mask register 1010 marks (sets to '1') all of the slots in the block up to and including the slot representing the currently serviced queue. The data from the service eligibility memory and the data from the data register are provided to a slot-wise AND 1020. The slot-wise AND 1020 provides a block having only the slots that are both eligible and non-empty activated (set to '1'). It should be noted that if the service eligibility status was not included the slotwise AND would not be required. Furthermore, it should be noted that if additional statuses (e.g., priority, enable) were added, the slotwise AND would consider all the statuses.

The results of the mask register 1010 are inverted and provided to an AND gate 1030 along with the results of the slot-wise AND 1020. The result of the AND gate 1030 would be to mask (zero out) all slots up to and including the currently serviced slot. Alternately, the mask register 1010 could mark the appropriate slots by setting them to '0', in which case the output would not need to be inverted prior to supplying to the AND gate 1030. The results from the AND gate 1030 are provided to a priority encoder 1040. The priority encoder 1040 searches the slots provided. If a valid slot is found the priority activates the valid-0 slot and provides the address (6 bits) of the next available slot to the QID.

Figure 11:
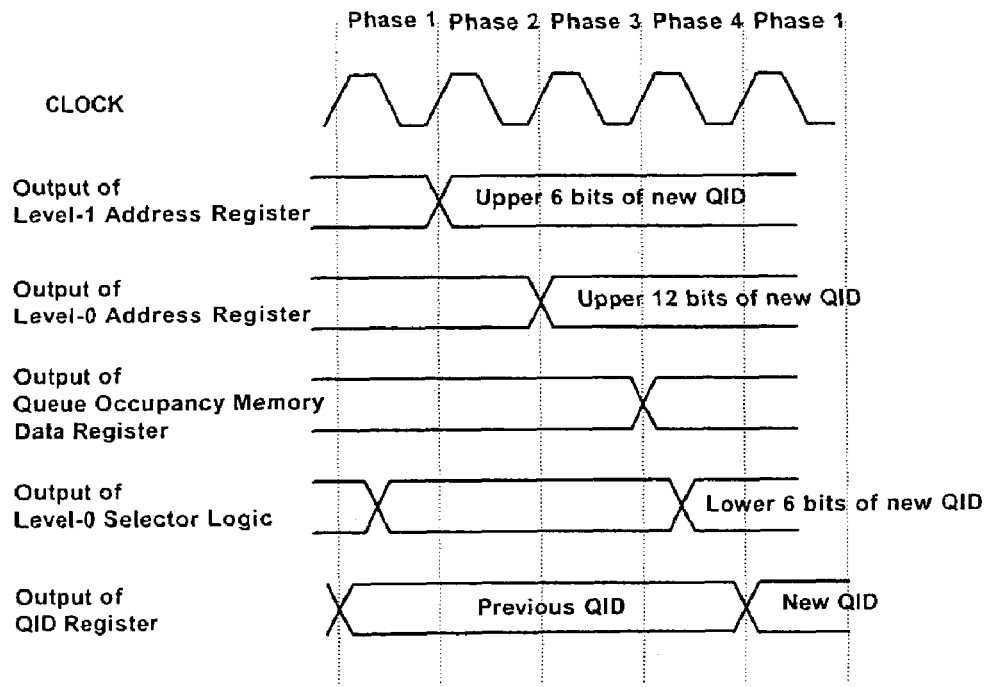
FIGS. 11–13 illustrate exemplary timing diagrams for the exemplary hardware embodiment of FIG. 7, according to one embodiment.
Figure 12:
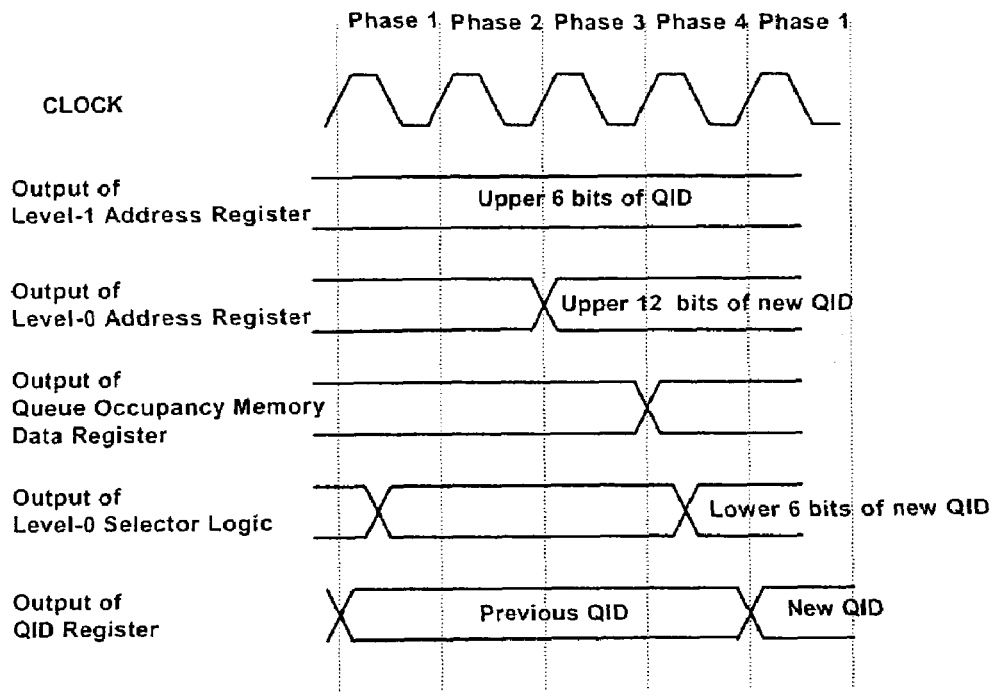
Figure 13:
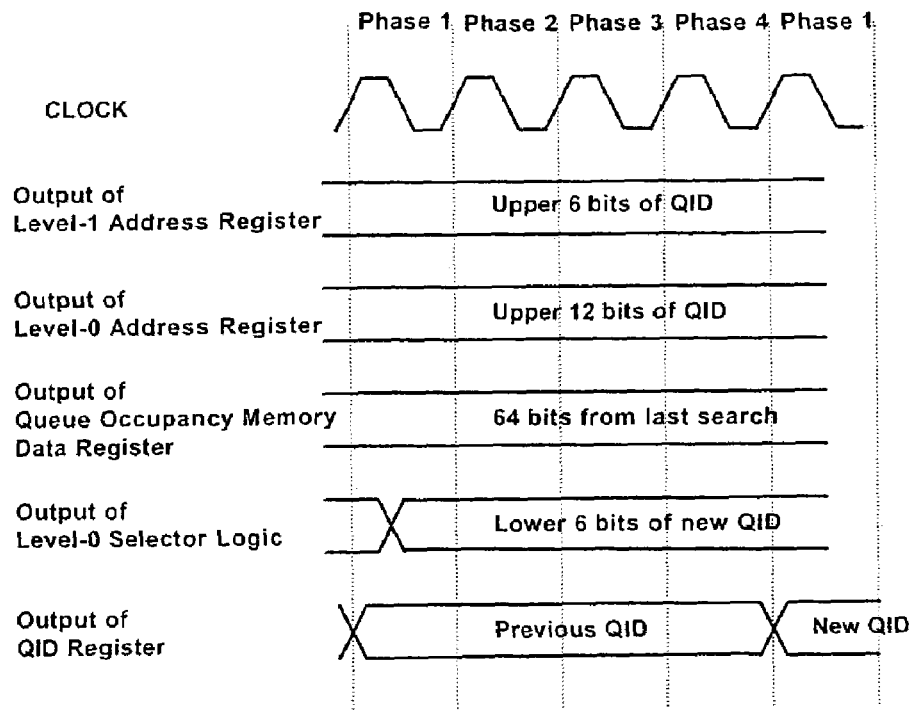

FIGS. 11–13 illustrate exemplary timing diagrams associated with various possible search results in a 3 level (n=3) hierarchical search structure (such as those illustrated in FIGS. 4, 6 or 7). Each Figure corresponds to one of three possible outcomes in the search process that were described above with respect to FIG. 7. When discussing the results for each of the four phases reference will be made to some of the components of FIG. 7. The four phases described are generated by the four consecutive cycles of a free-running clock.

FIG. 11 illustrates an exemplary timing diagram for a case when level 2 is the lowest level having a valid entry. That is, all three levels of the search structure need to be searched sequentially to determine the new index in the QID register 720. That is, both the level 0 and the level 1 searches failed to find the next valid queue index in Phase 1. In this case, the level 2 selector logic 710 identifies the 6-slot address of the next valid entry in the block occupancy register 705 and the output (6-bit address) is clocked into the level 1 address register 725 at the end of Phase 1. The output (6-bit address) is also clocked into the QID register 720 as these slots form the uppermost 6 slots of the 18-slot queue index to be computed in the QID register 720. The level 1 occupancy memory 730 uses this address (now stored in the level 1 address register 725) during Phase 2 to select the appropriate block (64 slots) to provide to the level 1 selector logic 735. The level 1 selector logic 735 identifies the 6-slot address of the next valid entry (the position of the first "1" slot in the block). The output (6-bit address) is latched into the level 0 address register 745 at the end of Phase 2. The output (6-bit address) is also clocked into the QID register 720 as these slots form the middle 6 bits of the 18-bit queue index to be computed in the QID register 720.

During Phase 3, the 6-bit address stored in the level 1 address register 725 and the 6-bit address stored in the level 0 address register 745 are concatenated together to form the 12-bit address necessary (upper 12 bits) to select the appropriate block from the queue occupancy memory 755. The appropriate block (64 slots) is clocked into the data register 760 at the end of Phase 3. The same 12-bit address is also used to access the service eligibility memory 750 and read out the service eligibility slots corresponding to the queue occupancy slots. In Phase 4, the level 0 selector logic 765 identifies the 6-bit address of the next valid entry (the position of the first "1" slot in the block) stored in the data register 760 that is eligible for service. The output (6 bit address) is provided to the QID register 720. Thus, at the end of Phase 4, the QID register 720 is updated with the new 18-bit queue index.

FIG. 12 illustrates an exemplary timing diagram for a case when level 1 is the lowest level having a valid entry. That is, level 1 and level 0 need to be searched in order to determine the index for the next queue in the OID register 720. During Phase 1, the level 1 selector logic 735 finds a valid entry (e.g., '1') to the right of the current position in the current 64-slot word (block) of the level 1 occupancy memory 730. The level 1 address register 725 is not updated at the end of Phase 1, rather it retains the same address it had during the last search operation. The output (6 bit address associated with slot having valid entry) of the level 1 selector logic 735 as well as the current 6-bit value from the level 1 address register 725, are written into the level 0 address register 745 at the end of Phase 2. These 12 bits form the upper 12 bits of the new queue index. The operations during Phases 3 and 4 proceed exactly as described above with respect to FIG. 11.

FIG. 13 illustrates an exemplary timing diagram for a case when level 0 is the lowest level having a valid entry. That is, during the Phase 1 search the level 0 selector logic 765 finds a valid entry (e.g., '1') to the right of the current position in the current 64-slot word (block) in the data register 760 that is also eligible for service as identified in the service eligibility memory 750. In this case, neither the level 1 address register 725 nor the level 0 address register 745 is updated at the end of phase 1. Rather the level 1 register 725 and the level 0 register 745 retain their old values, the upper six bits of the QID and the upper 12 slots of the QID accordingly. The 6-bit output of the level 0 selector logic 765 is identified during phase 1. The new QID in generated in the QID register 720 (and is available as an output) at the end of Phase 4.

In all the exemplary cases illustrated in FIGS. 11–13, a new search operation can be started at the end of Phase 4. Thus, one embodiment provides a new queue index at the output of the QID register 720 every 4 cycles, provided that there is at least one non-empty queue in the system that is eligible for service. In the event no such queue exists (as determined by the searches at all the three levels failing in Phase 1), the QID Valid signal 775 is de-asserted at the end of Phase 1.

The various embodiments are in no way limited to one new search every four clock cycles as illustrated in the exemplary embodiments of FIGS. 7–13. Rather, a complete round robin search can be performed every n+1 clock cycles, where n is the number of levels. There are multiple factors that determine the number of queues N in the store and forward device, the number of levels n, the aggregation factor (number of slots per block) m.

Each of the three cache modules 732, 752, 757 of FIG. 7 include multiple registers (entries) as previously discussed. The SEARCH, INSERT, REMOVE, and ENABLE processes compete for access to the queues. These processes need access to the memories in the search structure to read, modify and write back information. Since each process may be accessing a different location in memory, in general, only one read operation proceeds in any clock cycle. Similarly, only a single modify operation and a single write-back operation can proceed in a given clock cycle. This requires careful scheduling of the read, modify and write-back operations from different processes. The caches 732, 752, 757 are used to temporarily store data (e.g., occupancy, eligibility) so that if another process attempts to access the queue prior to the previous operation being complete and written back to memory (e.g., queue memory, eligibility memory) the new process reads the data from the cache and takes over operation of the cache. Accordingly, the data is written to the cache after the read and before modification is done. Thus, each of the processes will initiate a memory read, write the data to the cache, modify the data, and write the modified data back to memory (as well as remove it from the cache).

FIG. 14 illustrates an exemplary schedule of operations performed on the queue occupancy cache 757 of FIG. 7. An INSERT begins in phase 1. The INSERT initiates a memory read in phase 1, writes to cache in phase 2, modifies in phase 3, and writes back in phase 4. A SEARCH begins in phase 2. The SEARCH initiates a memory read in phase 2 and writes to cache in phase 3. The data written to cache is used subsequently for searching. However, the data is not written back as the SEARCH does not modify the data. A REMOVE begins in phase 3. The REMOVE initiates a memory read in phase 3, writes to cache in phase 4, modifies in phase 1, and writes back in phase 2. The above process prevents multiple reads, modifies or write-backs from occurring during a single clock cycle (phase).

When any process attempts a read from the queue occupancy memory, the address of the read is compared with the addresses stored in all the locations of the queue occupancy cache. If there is a match, the data from the matching entry in cache is used for subsequent operations in place of the data read from memory. That is the data is read from cache instead of memory. In addition, since the data is already in the queue the process will not write the data to the queue but instead will use the data that was in the cache already. Use of the cache thus avoids inconsistency in the data stored in the queue occupancy memory.

FIG. 15 illustrates an exemplary schedule of operations performed on the level 1 occupancy cache 732 of FIG. 7. A SEARCH begins in phase 1. The SEARCH initiates a memory read in phase 1 and writes to cache in phase 2. An INSERT begins in phase 2. The INSERT initiates a memory read in phase 2, writes to cache in phase 3, modifies in phase 4, and writes back in phase 4. A REMOVE begins in phase 3. The REMOVE initiates a memory read in phase 3, writes to cache in phase 4, modifies in phase 1, and writes back in phase 2.

FIG. 16 illustrates an exemplary schedule of operations performed on the service eligibility cache 752 of FIG. 7. This cache is used only by the search and enable processes. An ENABLE begins in phase 1. The ENABLE initiates a memory read in phase 1, writes to cache in phase 2, modifies in phase 3, and writes back in phase 4. A SEARCH begins in phase 2. The SEARCH initiates a memory read in phase 2 and writes to cache in phase 3.

Although the various embodiments have been illustrated by reference to specific embodiments, various changes and modifications may be made. Reference in the specification to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

What is claimed is:

1. An apparatus to search a plurality of queues to select one of the queues, the apparatus comprising:
   a queue occupancy device to indicate an occupancy status of the plurality of queues;
   a queue occupancy cache to record an update in occupancy status of a particular queue if the particular queue is involved in the search;
   a next queue selector to select a queue based on said queue occupancy device and a most recently serviced queue; and
   a queue identification register to identify a most recently serviced queue.

2. The apparatus of claim 1, wherein said queue occupancy cache writes the update back to said queue occupancy device upon completion of the search.

3. The apparatus of claim 1, further comprising a service eligibility device to identify queues that are eligible for service, wherein said next queue selector selects the queue based on said queue occupancy device, said service eligibility device and the most recently serviced queue.

4. The apparatus of claim 3, further comprising a service eligibility cache to record an update in the eligibility status of a particular queue if the particular queue is involved in the search.

5. The apparatus of claim 4, wherein said service eligibility cache writes the update back to said service eligibility device upon completion of a search.

6. The apparatus of claim 1, further comprising a queue enable device to limit queues that are enabled for service, wherein said next queue selector selects the queue based on said queue occupancy device, said queue enable device and the most recently serviced queue.

7. The apparatus of claim 1, wherein said queue occupancy device is a plurality of occupancy registers organized and connected together in a hierarchal structure, wherein an occupancy register has a plurality of slots organized into at least one block, a block of slots at one level summarized as a single slot at a next higher level.

8. The apparatus of claim 7, wherein said queue identification register identifies the most recently serviced queue by identifying an associated slot within a block in each occupancy register, the associated slot within one occupancy register identifying the block at a next lower occupancy register.

9. The apparatus of claim 7, wherein said next queue selector includes a plurality of selector logic units equal in number to the plurality of occupancy registers, wherein each selector logic unit is used to search an individual block within an associated occupancy register.

10. The apparatus of claim 9, wherein said next queue selector further includes a processor to instruct the plurality of selector logic units to:
    search in parallel an appropriate block within each of the plurality of occupancy registers for a slot representing a valid queue, wherein the appropriate block is identified in the queue identification register;
    determine lowest valid level of the hierarchal structure that has an occupancy register having a slot representing a valid queue;
    for each occupancy register below the lowest valid level, identify a block to search based on valid slot from an occupancy register directly above in the hierarchal structure; and
    search the identified block to identify a slot representing a valid queue; and
    record the valid slot for each occupancy register within the hierarchal structure in the queue identification register.

11. The apparatus of claim 10, wherein the processor further instructs the plurality of selector logic units to search said queue occupancy cache instead of said queue occupancy device for a specific queue if the update has not been recorded back to said queue occupancy device when the specific queue becomes involved in the search.

12. In a store and forward device, a method for updating queues at the same time as performing a search on the queues, the method comprising:
    searching a queue status hierarchy to find a next slot representing a valid queue;
    receiving updates to the queue status hierarchy; and
    recording the updates in a queue status cache if the updates occur during said searching.

13. The method of claim 12, further comprising recording the updates to the queue status device at conclusion of said searching.

14. The method of claim 12, wherein said searching includes
    searching in parallel an appropriate block at each level of the queue status hierarchy for a slot representing a valid queue, wherein the appropriate block is identified in the queue identification register;
    determining a lowest level to have a slot representing a valid queue;
    for each successive level below the lowest level,
    identifying a block to search based on a slot from a level directly above; and
    searching the identified block for a slot representing a valid queue; and
    recording the valid slot for each level in the queue identification register.

15. The method of claim 14, wherein said searching in parallel includes starting the search of the appropriate block at each level of the queue occupancy hierarchy at a next slot after a slot identified in the queue identification register.

16. The method of claim 14, wherein the queue status hierarchy identifies an occupancy status for each of the plurality of queues and a valid slot indicates an associated queue is non-empty.

17. The method of claim 16, wherein the queue status hierarchy further identifies at least some subset of eligibility status, enablement status, and priority status for each of the plurality of queues and a valid slot indicates an associated queue is non-empty and at least some subset of eligible, enabled and prioritized respectively.

18. A store and forward device for updating queues at the same time as performing a search on the queues, the device comprising:
- a plurality of receivers to receive packets of data;
- a storage medium to store the packets of data in a plurality of queues;
- a plurality of transmitters to transmit the packets of data from the queues;
- a queue occupancy device to indicate an occupancy status of the plurality of queues;
- a queue occupancy cache to record an update in occupancy status of a particular queue if the particular queue is involved in the search;
- a next queue selector to select a queue based on the queue occupancy device and a most recently serviced queue; and
- a queue identification register to identify a most recently serviced queue.

19. The device of claim 18, wherein said queue occupancy cache writes the update back to said queue occupancy device upon completion of the search.

20. The device of claim 18, further comprising a service eligibility device to identify queues that are eligible for service, wherein said next queue selector selects the next queue available for service based on said queue occupancy device, said service eligibility device and the most recently serviced queue.

21. The device of claim 20, further comprising a service eligibility cache to record an update in the eligibility status of an associated queue if the associated queue is involved in the search.

22. The device of claim 21, further comprising a queue enable device to limit queues that are enabled for service, wherein said next queue selector selects the next queue available for service based on the queue occupancy device, the queue enable device and the most recently serviced queue.

23. The device of claim 18, wherein said queue occupancy device is a plurality of occupancy registers organized and connected together in a hierarchal structure, wherein each occupancy register has a plurality of slots organized into at least one block, a block of slots in a first occupancy register at a first level of the hierarchal structure are summarized as a single slot in a second occupancy register at a next higher level of the hierarchal structure.

24. The device of claim 23, wherein said next queue selector
- searches in parallel an appropriate block within each of the plurality of occupancy registers for a slot representing a valid queue, wherein the appropriate block is identified in the queue identification register;
- determines lowest valid occupancy register to have a slot representing a valid queue;
- for each successive occupancy register below the lowest valid occupancy register,
- identifies a block to search based on a slot from an occupancy register directly above; and
- searches the identified block for a slot representing a valid queue; and
- records the valid slot for each occupancy register in the queue identification register.

25. The device of claim 18, wherein said receivers are Ethernet cards.

26. The device of claim 18, further comprising an optical backplane.

27. In a store and forward device, a method for generating a service status hierarchal structure to identify status of each of a plurality of queues at a plurality of levels, the method comprising:
- at a lowest level, associating a queue occupancy slot with each queue, wherein the queue occupancy slot reflects an occupancy status of the associated queue;
- organizing the queue occupancy slots into a plurality of blocks;
- for each successively higher level,
- associating one block occupancy slot with a block of slots from next lower level, wherein the block occupancy slot summarizes an aggregate occupancy status of the associated block; and
- organizing the block occupancy slots into a plurality of blocks, wherein a highest level is organized as a single block;
- assigning a queue currently being serviced a queue identification, wherein the queue identification identifies a slot within a block at each level that is associated with the queue currently being serviced, the slot at one level identifying the block at a next lower level; and
- associating at least one queue occupancy cache with at least one level of the service status hierarchal structure.

28. The method of claim 27, further comprising searching the queue status hierarchy in a fashion to find next slot representing a valid queue.

29. The method of claim 27, further comprising associating service eligibility slots with individual queues or blocks of queues, wherein each service eligibility slot identifies whether the individual queue or block of queues is eligible for service.

30. The method of claim 27, further comprising associating queue enable slots with individual queues or blocks of queues, wherein each queue enable slot identifies whether the individual queue or block of queues is enabled for service.

31. A computer program product, disposed on a computer readable medium, the program including instructions for causing a processor to:
- search a queue status hierarchy to find a next slot representing a valid queue;
- receive updates to the queue status hierarchy; and
- record the updates in a queue status cache if the updates occur during said searching.

32. The program of claim 31, further comprising instructions for causing the processor to record the updates to the queue status device at conclusion of said searching.

* * * * *